(No Model.)
N. J. LANGLEY.
GRIDIRON.
No. 306,164. Patented Oct. 7, 1884.
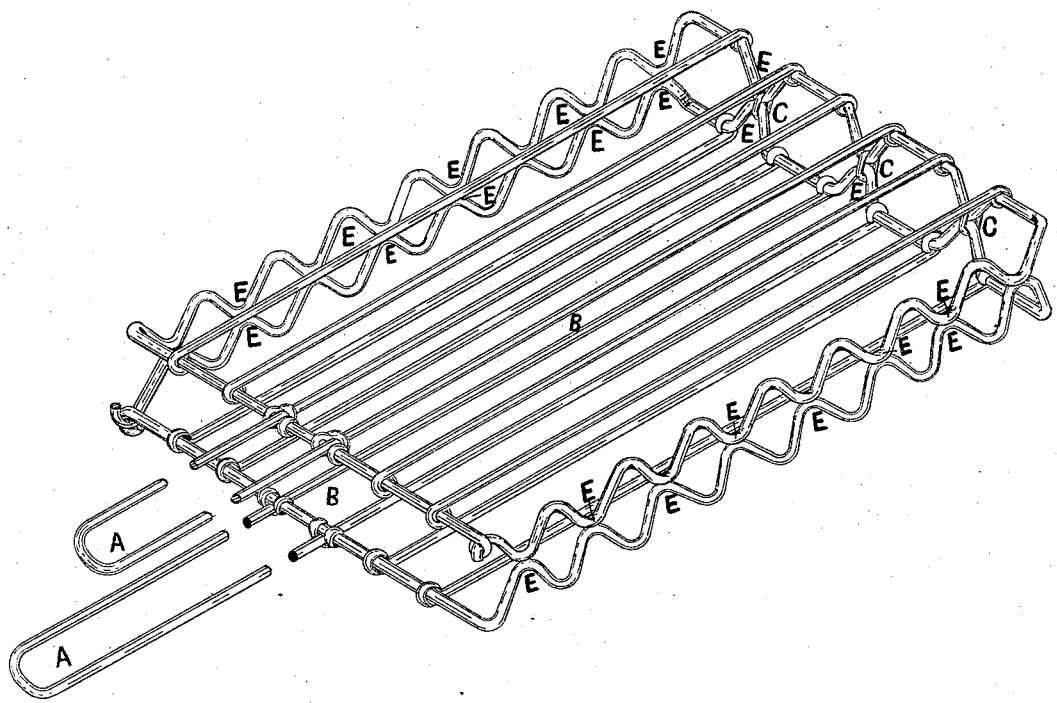
Witnesses:
Chas. S. Gooding
W. R. Marble
Inventor:
Nancy J. Langley,
By Sylvenus S. Walker
Atty

United States Patent Office.

NANCY J. LANGLEY, OF BOSTON, MASSACHUSETTS.

GRIDIRON.

SPECIFICATION forming part of Letters Patent No. 306,164, dated October 7, 1884.

Application filed September 5, 1883. (No model.)

*To all whom it may concern:*

Be it known that I, NANCY J. LANGLEY, of Boston, in the county of Suffolk and State of Massachusetts, have invented certain new and useful Improvements in Gridirons, of which the following is a specification.

The object of my invention is to provide a cheap, simple, and convenient gridiron for broiling slices of meat, fish, and similar articles of food, and for toasting bread or crackers and other articles of diet without liability of the thinner pieces slipping therefrom when the gridiron is being turned over or "upside down," as is frequently the case when the common gridiron is employed; and it consists in the construction, combination, and arrangement of a series of lateral projections at each edge of one or both of the opposite parts or hinged side pieces, and also providing similar projections at the hinged end portion of one or both of the side pieces, as hereinafter more fully described, and set forth in the claim.

The drawing represents a perspective view of a gridiron constructed according to my invention.

A A represent the handles of the two side portions or pieces, B B, hinged together at their opposite ends by suitable link-connections, C, as heretofore, and constructed of bent wires, as shown, or in any other desired manner. Now, in order to prevent slices of food placed between the two side portions from slipping therefrom, I form the edge wires of one or both of said side portions with projections E, which extend inwardly or toward the opposite side, so as to be nearly in contact therewith, or so as to pass between similar projections formed on the opposite side portions, so that when such slices are placed between said portions in order to cook, broil, or toast the same upon both sides by turning the gridiron over, they are prevented by said projections from slipping from between the said side portions into the fire, or falling out when removing the gridiron for any purpose. It will be seen and understood that such projections or stop portions may be provided by crimping or bending the outer edge wires, as shown, or by constructing it in a variety of ways to accomplish the object contemplated by my invention. It will be seen and understood that the said projections formed in the edge wires of the opposite hinged side portions extend in both directions or to both sides of the line of wires forming the said side portions, or so that the two halves or side portions may be turned or brought together with either sides thereof inwardly and leave a sufficient or equal number of projections extending inwardly, when folded, upon the article of food placed therein, as to prevent the same falling out when the gridiron is being turned over, which is the essential feature of my invention; therefore I do not broadly claim projections formed upon the edges of gridirons, as similar devices have heretofore been employed.

Having thus described my invention, what I claim is—

A reversible gridiron having each of its outermost or edge wires formed with bends which extend in both directions or each side of the plane or line of wires forming the main hinged portions, so that when the same are brought together the said bends shall extend inwardly, substantially as shown and described.

NANCY J. LANGLEY.

Witnesses:
SYLVENUS WALKER,
JOHN F. LANGLEY.